May 8, 1928. 1,669,259
F. F. MAIN
POWER DRIVE FOR MOTOR VEHICLE STEERING MECHANISM
Filed April 15, 1927 3 Sheets-Sheet 1
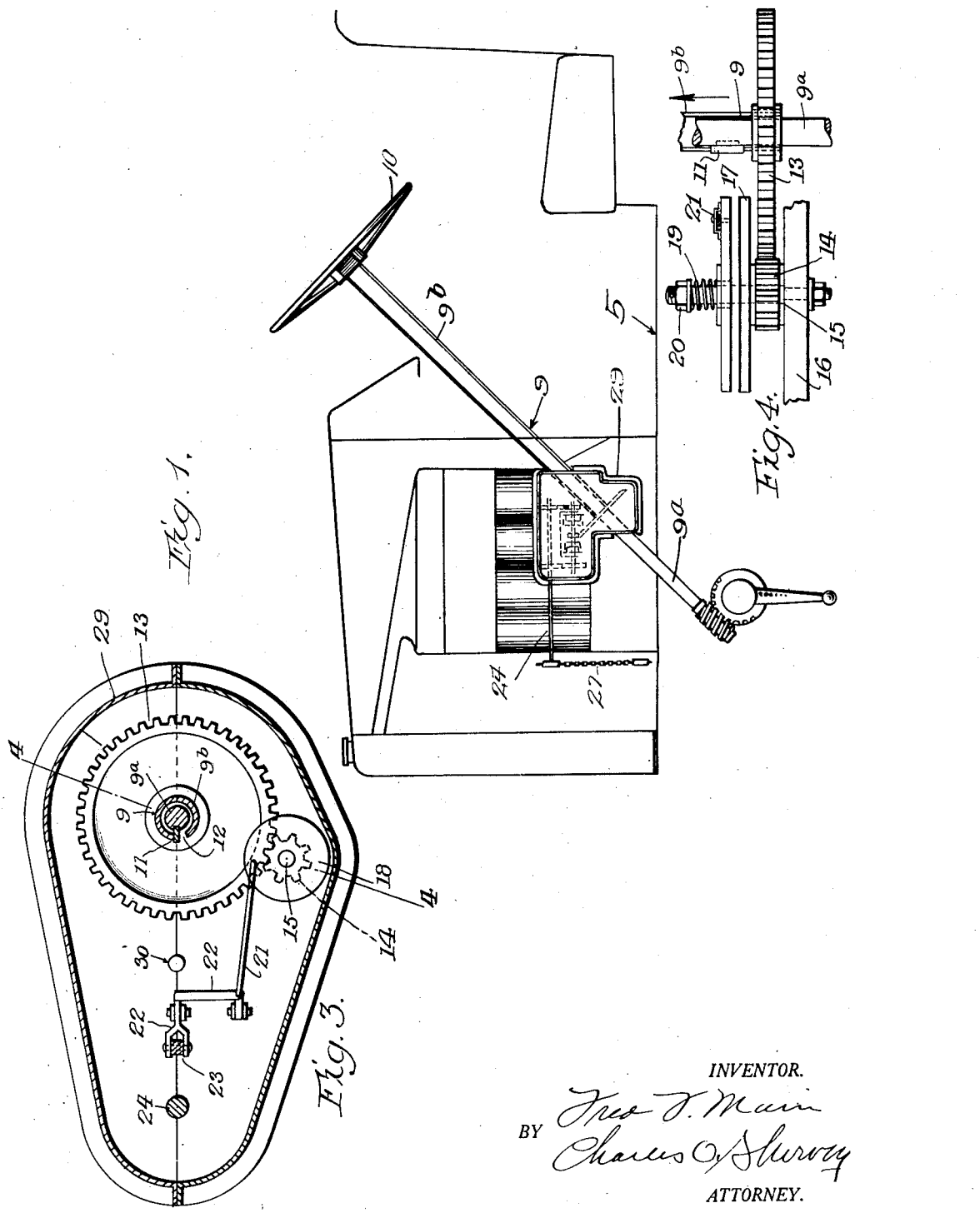
INVENTOR.
Fred F. Main
BY Charles O. Shurvey
ATTORNEY.

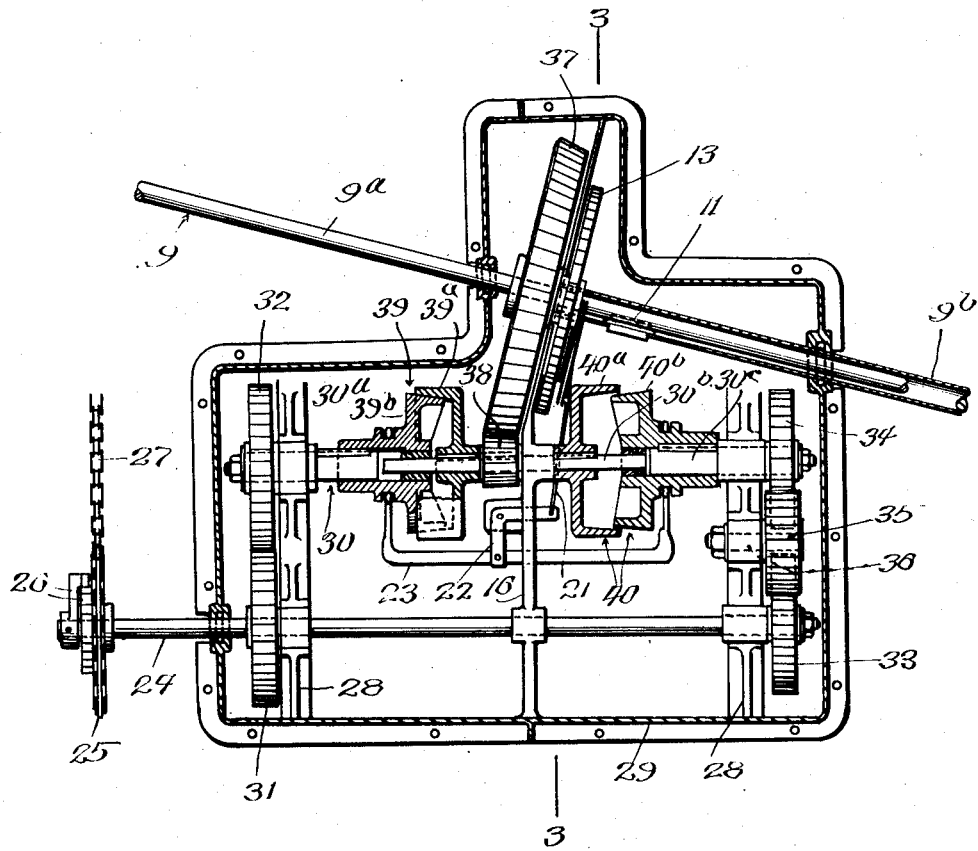

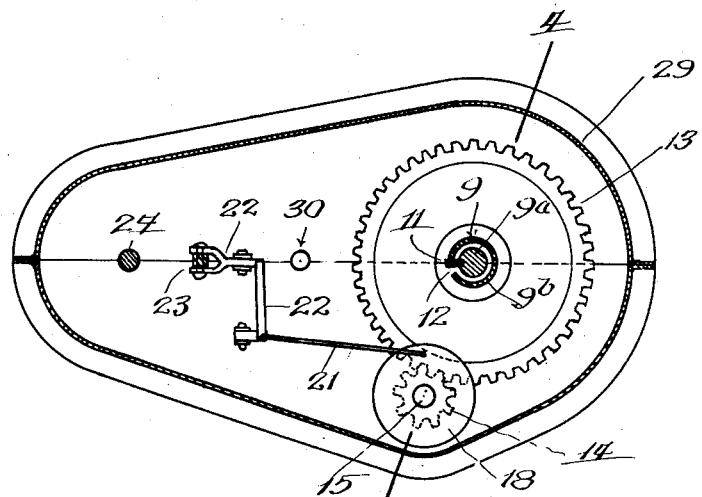
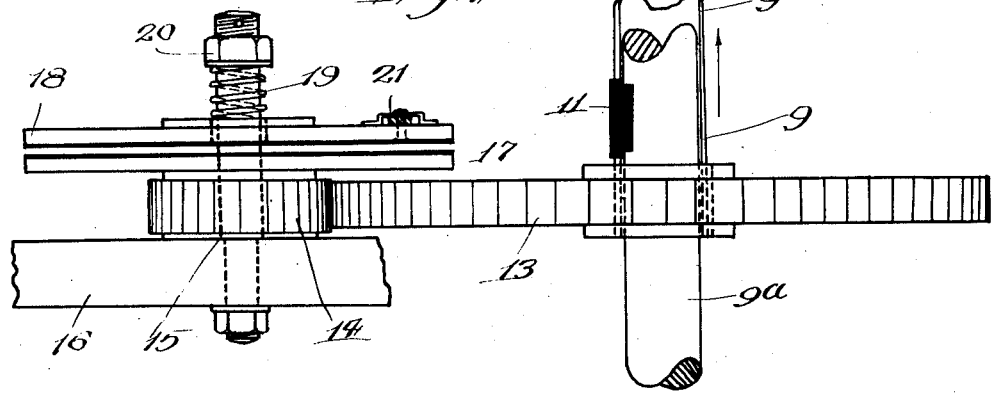

Patented May 8, 1928.

1,669,259

UNITED STATES PATENT OFFICE.

FRED F. MAIN, OF CHICAGO, ILLINOIS.

POWER DRIVE FOR MOTOR-VEHICLE STEERING MECHANISM.

Application filed April 15, 1927. Serial No. 183,943.

This invention relates to power drive for motor vehicle steering mechanism, and its principal object is to provide means by which the power of the motor is automatically applied to the steering mechanism of the vehicle whenever the hand steering wheel is moved. It is understood that the power necessary to turn the steering mechanism used in automobiles, trucks and other motor vehicles, especially when the vehicle is standing, is very great and necessitates severe strain upon any but a robust driver. It often occurs in parking and turning in restricted places, that the steering mechanism must be operated while the vehicle is standing, because the space is so limited that to turn the steering wheel while the vehicle is in motion uses up all of the space for travel before the steering mechanism reachs its full movement. I have overcome this difficulty by providing a power drive for the existing steering mechanism under the control of the usual steering wheel and constructed and arranged in such manner that the steering mechanism is operated by power derived from the motor.

With these and other objects and advantages in view, this invention consists in a power drive for motor vehicle steering mechanism, operated from some power shaft or other continuously rotating element of the motor, and controlled by the usual steering wheel of the vehicle. The invention further consists in a power drive for motor vehicle steering mechanism in which the vehicle may be steered in any desired direction by a motor driven steering mechanism controlled by the usual hand steering wheel of the vehicle. It further consists in a power drive for steering mechanism controlled by the usual hand steering wheel, which steering mechanism is capable of being manually operated by said hand steering wheel whenever the motor is at rest. It further consists in the several novel features of construction, arrangement and combination of parts hereinafter fully set forth and claimed.

The invention is clearly illustrated in the drawings accompanying this specification, in which;

Fig. 1 is a diagrammatic view of a fragment of a motor vehicle showing, in side elevation, a simple embodiment of the present invention applied thereto; Fig. 2 is a vertical, longitudinal section taken through the housing of the power drive mechanism; Fig. 3 is a detail vertical cross section taken on the line 3—3 of Fig. 2 and Fig. 4 is a detail plan on an enlarged scale of said gearing and certain friction discs forming part of the invention.

Referring to said drawings, the reference character 5 designates a fragment of a motor vehicle, such as an automobile, provided with the ordinary steering mechanism to which my power drive is attached. The only change which I make in the present day steering mechanism is to provide a slight lost motion in the upper part of the steering rod. Upon the upper end of the steering rod 9 is the usual hand steering wheel 10 and in the form illustrated said steering rod is formed of two sections 9ᵃ, 9ᵇ (see Fig. 2) the one telescoping into the other and having a limited amount of lost motion between them whereby the section of the steering rod directly connected with the steering wheel may be turned slightly in either direction before the section which turns the steering wheels is moved. The lost motion connection between the two sections of the steering rod is shown to comprise a key 11 secured in the section 9ᵃ of the steering rod and entering a slot 12 in the section 9ᵇ. The slot is of sufficient lateral extent to permit the key to be moved through an arc of some extent, before it engages with either side edge of the slot.

Rigidly mounted upon the section 9ᵇ of the steering rod is a gear wheel 13, which meshes with a pinion 14, journaled upon a stud shaft 15 mounted in a bearing bracket 16 contained in a housing 29. To the pinion 15 is rigidly connected a friction disc 17, which is frictionally engaged by a friction disc 18 mounted upon the stud shaft 15 and held in frictional engagement with the friction disc 18 by a coiled compression spring 19, confined between the outer face of the friction disc 19 and a nut 20 threaded upon the outer threaded end of the stud shaft 15. It will be obvious that whenever the steering wheel and the section 9ᵇ of the steering post connected therewith, is moved in either direction, the friction disc 17 will be rotated therewith but at a greater rate of speed on account of the gear ratio between the pinion 14 and gear wheel 13 and the friction disc 18 therefore will rotate with the disc 17.

Connected with the friction disc 18 is a link 21, which leads to a bell crank lever 22 fulcrumed upon the bracket 16 and having its other arm connected to a yoke like clutch actuating member 23. The mechanism thus far described provides clutch operating mechanism controlled by and operated by the hand steering wheel of the vehicle and the driving mechanism for the power operated end of the steering rod will now be described.

Located adjacent the clutches is a power driven shaft 24, which receives its power from the motor of the vehicle. Said shaft is arranged to run continuously while the motor is in operation, and for convenience I have shown a sprocket wheel 25 upon one end of the shaft 24 and connected therewith by a pawl and ratchet mechanism 26, said sprocket wheel being connected to some continuously driven shaft of the motor by a sprocket chain 27 trained over the sprocket wheel 25 and over a sprocket wheel on said continuously driven shaft of the motor vehicle. The shaft 24 is journaled in bearing brackets 28 contained in the housing 29, which encloses practically all of the driving mechanism and may contain lubricant for lubricating all of the parts contained therein.

In the form of the invention illustrated, the shaft 24 extends parallel with a clutch shaft 30, also mounted in the bearing brackets 28 and composed of three sections $30^a$, $30^b$ and $30^c$ all in co-axial alignment, but each section capable of rotation independently of the others. A pinion 31 rigidly mounted on the shaft 24 and a pinion 32 rigidly mounted on the section $30^a$ of the clutch shaft 30 and meshing with said pinion 31, provides gearing between the shafts 24, 30 for driving the shaft section $30^b$ in one direction, and a pinion 33 rigidly mounted on the shaft 24, a pinion 34 rigidly mounted on the section $30^c$ of the clutch shaft 30, and an idler pinion 35 journaled on a stud shaft 36 secured in one of the bearing brackets 28, provides gearing between the shaft 24 and shaft section $30^c$ for driving the shaft section $30^b$ in a direction opposite to which it is driven by the pinions 31, 32. It is understood that the shaft 24 is continuously driven in one direction.

Rigidly mounted upon the section $9^a$ of the steering rod is a beveled gear wheel 37, which meshes with a beveled pinion 38 rigidly mounted on the section $30^b$ of the clutch shaft 30. Mounted on the clutch shaft on each side of the beveled pinion 38, are two clutches 39, 40, the clutch members $39^a$, $40^a$ of which are keyed or otherwise rigidly secured upon the section $30^b$ of the shaft and the movable member $39^b$, $40^b$ of which are slidably mounted on the sections $30^a$, $30^c$, respectively, of the shaft 30 and secured against rotation relative thereto, as for instance by key and key ways. The clutch operating member 23 is forked at its two ends and engages in grooves or the like formed in the movable members $39^b$, $40^b$ of the two clutches. Although cone clutches are illustrated in the drawings for the purpose of connecting the middle section $30^b$ with the sections $30^a$, $30^c$ of the clutch shaft, it is to be understood that it is not the intention to limit myself to cone clutches as various other type of clutches may be substituted therefor.

Under normal conditions both clutches are disengaged whereby the shaft 24 and the two sections $30^a$, $30^c$ of the clutch shaft may rotate idly, the one section rotating in a reverse direction to the other. By throwing either clutch into action the middle section $30^b$ of the clutch shaft is caused to rotate and the section $9^a$ of the steering rod is thereby caused to rotate through the instrumentality of the intermeshing pinion 38 and gear wheel 37, and thus the power derived from the motor is transferred to the section $9^a$ of the steering rod.

In the operation of the mechanism, the two sections $30^a$, $30^c$ of the clutch shaft are continuously rotated in reverse directions so long as the motor continues to operate, while the middle section $30^b$ remains at rest inasmuch as both clutches are disengaged. Wishing to steer the vehicle the driver turns the steering wheel 10 and in turning the steering wheel the section $9^b$ of the steering post is turned, and therewith the gear wheel 13, the rotation of which causes rotation of the pinion 14 and friction discs 17, 18. The rotation of the friction disc 18 causes the link 21 to be shifted endwise in the same direction as the friction disc 18 is moved, thereby swinging the bell crank lever 22 upon its fulcrum and shifting the yoke like clutch actuating member 23 in a direction to throw one of the clutches in and to further throw the other clutch out of engagement. The clutch which was thrown into engagement thereupon connects the rotating end section of the clutch shaft with the middle section $30^b$, causing said middle section to be rotated in the same direction, and the section $9^a$ of the steering post is thereupon rotated through the instrumentality of the intermeshing pinion 38 and gear wheel 37. So long as the driver continues to hold the active clutch in clutched condition, which he does by exerting a continuous turning movement upon the steering wheel in the direction he wishes to steer the vehicle, the drive connection between the power shaft 24 and steering rod section $9^a$ remain active and said steering rod section continues to be turned through the efforts of the motor. When, however, the active clutch is disengaged, as for instance by the driver discontinuing the turning action on the steering wheel or particularly as soon as he starts to turn it in the opposite direction, then the connections between the power shaft 24 and middle section 30ᵇ of the clutch shaft is broken and rotation of the steering rod section 9ᵃ by the motor is stopped. The clutches are adjusted that they engage with a slipping action, well known in such devices so that the engagement of either clutch produces no shock.

By reason of the key and slot connection between the two sections 9ᵇ, 9ᵃ of the steering rod, the driver may turn the front wheels for the purpose of steering the vehicle when the motor is at rest. In such case the mechanism described is rotated from the steering rod section 9ᵇ, and this is possible because of the pawl and ratchet connection 26 between the sprocket wheel 25 and sprocket chain 27 which permits the shaft 24 to turn without disturbing the motor.

The steering mechanism is especially serviceable in connection with motor vehicles equipped with low pressure tires or in connection with heavy duty vehicles. It eliminates the work of manually turning the steering mechanism of the vehicle and places that burden entirely upon the motor. In close situations the steering mechanism is particularly advantageous because the steering wheels may be turned by the power of the motor, while the vehicle is standing still thus relieving the driver of the heavy duty and the time usually required in parking his car in close places. Furthermore, in case the motor is at rest the mechanism does not interfere with the manual operation by the driver since the power driven shaft for the steering mechanism may be turned without disturbing the motor. All of the gearing being contained in the housing, which may be filled with grease or other lubricant, very little friction is occasioned and very little additional work is placed upon the motor.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A power drive for motor vehicle steering mechanism, comprising in combination, a sectional steering post, one section having a hand steering wheel thereon and the other section being arranged for connection with the steering wheels of the vehicle, a continuously rotating power driven element, and power transmission gearing between said power driven element and the second mentioned section of the steering post, said power transmission gearing including two continuously but reversely rotating elements and a normally stationary element, and clutches for connecting said normally stationary element with said reversely rotating elements, and clutch actuating mechanism operatively connected with said first mentioned steering post section.

2. A power drive for motor vehicle steering mechanism, comprising in combination, a sectional steering post, one section having a hand steering wheel thereon and the other section being arranged for connection with the steering wheels of the vehicles, a continuously rotating power driven shaft and a power transmission gearing between said power driven shaft and the second mentioned section of the steering post, said power transmission gearing including a clutch shaft composed of two continuously, but reversely rotating shaft sections and a normally stationary shaft section, clutches for connecting said normally stationary shaft section, with either of said reversely rotating shaft sections, and clutch actuating mechanism operatively connected with said first mentioned steering post section.

3. A power drive for motor vehicle steering mechanism, comprising in combination, a sectional steering post, one section having a hand steering wheel thereon and the other section being arranged for connection with the steering wheels of the vehicle, a lost motion connection between said two sections of the steering post, a continuously rotating power driven element, and power transmission gearing between said power driven element and the second mentioned section of the steering post, said power transmission gearing including two continuously but reversely rotating elements and a normally stationary element, clutches for connecting said normally stationary element with either of said reversely rotating elements, and clutch actuating mechanism operatively connected with said first mentioned steering post section.

4. A power drive for motor vehicle steering mechanism, comprising in combination, a sectional steering post, one section having a hand steering wheel thereon and the other section being arranged for connection with the steering wheels of the vehicle, a continuously rotating power driven element, power transmission gearing between said power driven element and the second mentioned section of the steering post, said power transmission gearing including two continuously but reversely rotating elements and a normally stationary element and clutches for connecting said normally stationary element with either of said reversely rotating elements, and clutch actuating mechanism operatively connected with said first mentioned steering post section and embodying two companion friction discs.

5. A power drive for motor vehicle steering mechanism, comprising in combination, a sectional steering post, one section having a hand steering wheel thereon, and the other section being arranged for connection with the steering wheels of the vehicle, a continuously rotating power driven shaft, a clutch shaft composed of a normally stationary section and two reversely rotating sections, gearing between said power shaft and two reversely rotating clutch shaft sections, a pinion on said normally stationary clutch shaft section and a gear wheel on said second mentioned steering post section meshing with said pinion, co-acting clutch members on said normally stationary clutch shaft section and said reversely rotating clutch shaft sections, clutch actuating mechanism for operating both clutches in unison, and operative connections between said clutch actuating mechanism and the first mentioned steering post section.

6. A power drive for motor vehicle steering mechanism, comprising in combination, a sectional steering post, one section having a hand steering wheel thereon and the other section being arranged for connection with the steering wheels of the vehicle, a continuously rotating power driven element, and power transmission gearing between said power driven element and the second mentioned section of the steering post, said power transmission gearing including two continuously but reversely rotating elements and a normally stationary element, and clutches for connecting said normally stationary element with said reversely rotating elements, a gear wheel on said first mentioned steering post section, a pinion meshing with said gear wheel, a pair of co-acting friction discs, one of which is rotatively connected with said pinion, and operative connections between said clutches and the other of said friction discs.

7. A power drive for motor vehicle steering mechanism, comprising in combination, a sectional steering post, one section having a hand steering wheel thereon and the other section being arranged for connection with the steering wheels of the vehicle, a continuously rotating power driven element, and power transmission gearing between said power driven element and the second mentioned section of the steering post, said power transmission gearing including two continuously but reversely rotating elements and a normally stationary element, and clutches for connecting said normally stationary element with said reversely rotating elements, a clutch actuating member, connecting the movable members of both clutches, a pair of co-acting friction discs, operative connections between one of said friction discs and said clutch actuating member, and disc rotating means operatively connecting the other of said friction discs with the first mentioned steering post section.

8. A power drive for motor vehicle steering mechanism, comprising in combination, a sectional steering post, one section having a hand steering wheel thereon and the other section being arranged for connection with the steering wheels of the vehicle, a continuously rotating power driven element, and power transmission gearing between said power driven element and the second mentioned section of the steering post, said power transmission gearing including two continuously but reversely rotating elements and a normally stationary element, and clutches for connecting said normally stationary element with said reversely rotating elements, a clutch actuating member, connecting the movable members of both clutches, a pair of co-acting friction discs, operative connections between one of said friction discs and said clutch actuating member, a gear wheel on said first mentioned steering post section, a pinion rotatively connected with the other of said friction discs and meshing with said gear wheel.

FRED F. MAIN.